July 23, 1963
D. S. LITTLE ETAL
3,098,381
VERTICAL SPEED INDICATOR
Filed Sept. 10, 1959
2 Sheets-Sheet 1
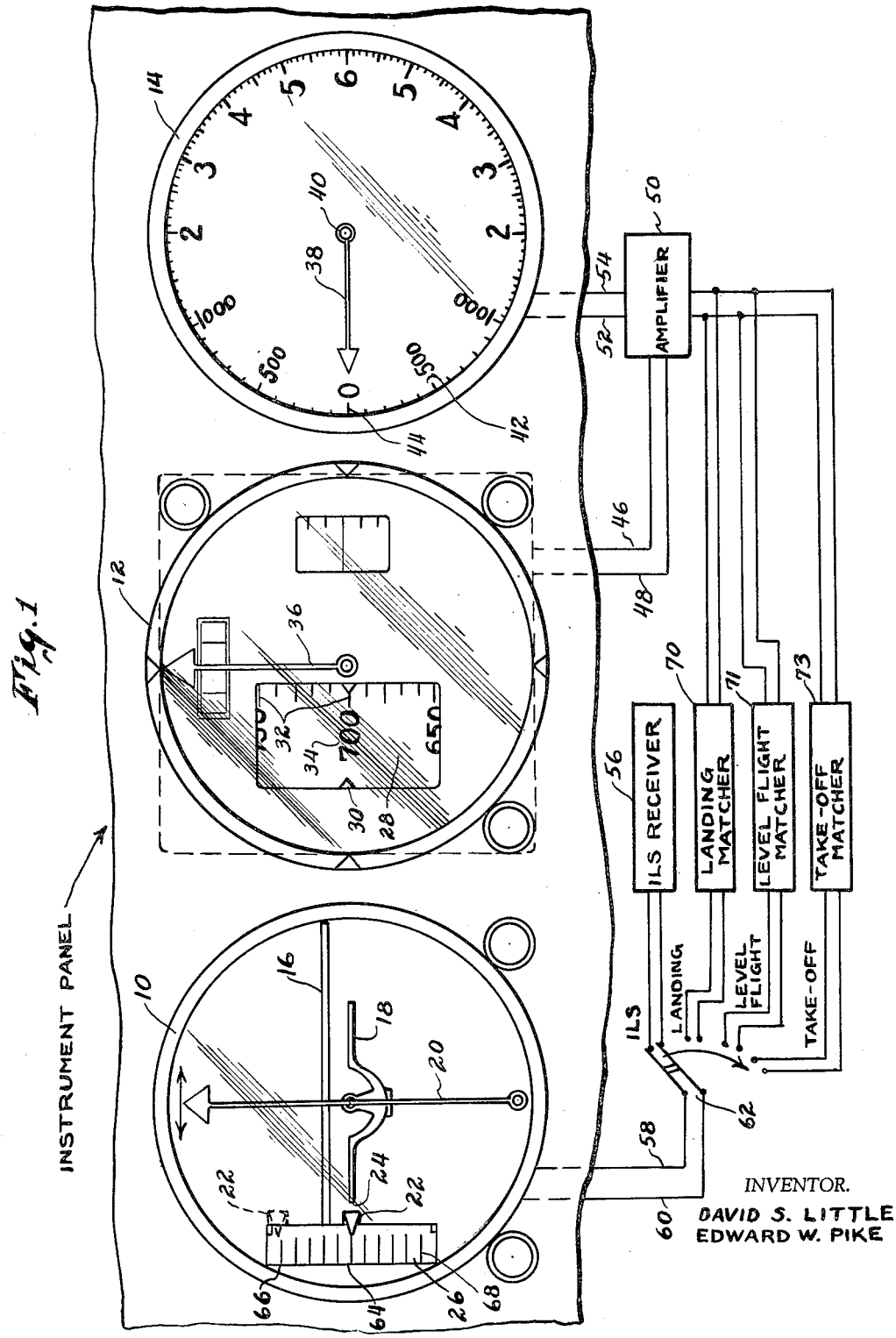
INVENTOR.
DAVID S. LITTLE
EDWARD W. PIKE July 23, 1963
D. S. LITTLE ETAL
3,098,381
VERTICAL SPEED INDICATOR
Filed Sept. 10, 1959
2 Sheets-Sheet 2
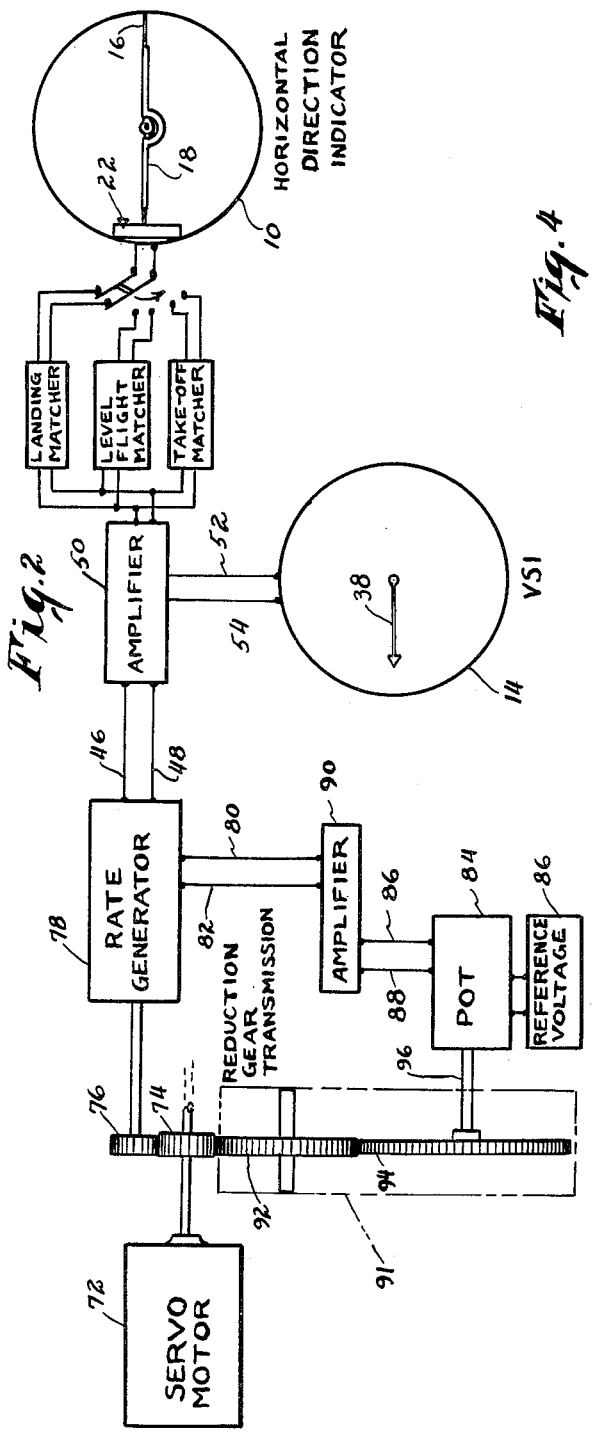
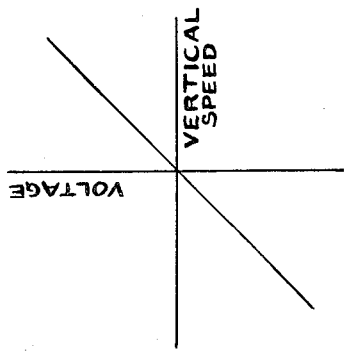
Fig. 4
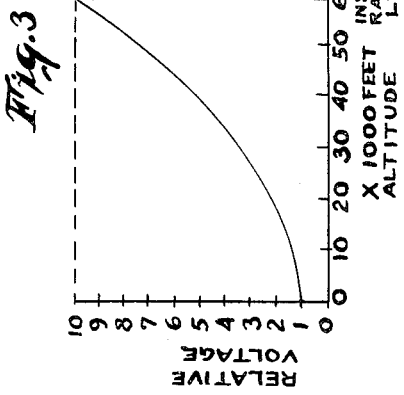
Fig. 3
INVENTOR.
DAVID S. LITTLE
EDWARD W. PIKE

United States Patent Office 3,098,381
Patented July 23, 1963

3,098,381
VERTICAL SPEED INDICATOR
David S. Little, 35 Bogart Ave., Port Washington, N.Y., and Edward W. Pike, 135 Ellerman Ave., Twickenham, England
Filed Sept. 10, 1959, Ser. No. 839,238
7 Claims. (Cl. 73—179)

This invention relates to a vertical speed indicator, and more particularly, to a vertical speed indicator for the instantaneous indication of aircraft vertical speed.

In modern aircraft the pilot must rely on the instrument display for the flight information necessary for proper aircraft control. Of critical importance to the pilot is vertical speed information (often called rate of climb), since such information is vitally necessary to the most critical flight portions, namely, take-off and landing. During take-off, maintenance of a positive rate of climb during acceleration to the best climb airspeed is obviously essential. Similarly, during landing the rate of descent is a critical factor in flight path control.

The present "rate of climb" indicators using aneroid capsules with a bleed hole therein have too much lag to be of value to modern high speed aircraft.

The present instantaneous rate of climb indicators using an aneroid capsule with a bleed hole for indicating average rate of climb upon which is superimposed rate of climb information derived from an accelerometer cannot provide the necessary flexibility of information display and increases control panel volume density, since it is a separate instrument with its contained sensors. The lack of flexibility in display presentation requires that the pilot scan a plurality of instruments.

For example, during landing of modern aircraft, the pilot will align his aircraft with the runway, establish a rate of descent, suitable for the aircraft and for the glide path selected, such as 400 ft. per minute, and establish an approach speed suitable for the aircraft loading and flight characteristics. These conditions are then maintained during approach until touchdown, when the aircraft is braked.

During approach the pilot must continuously observe the runway to ensure that the aircraft is approaching the runway properly. At the same time, the pilot must monitor the aircraft attitude as displayed on the horizontal director indicator. Such monitoring is necessary in modern aircraft since the aircraft configuration and the cockpit location has essentially deprived the pilot of any reliable horizontal reference which can be compared with the horizon for control of aircraft attitude about the roll axis. In aircraft in which the engines are located in suspended pods, control of attitude about the roll axis within a few degrees is mandatory to prevent striking the ground with the pods during landing.

Additionally, the pilot must monitor the altimeter to ensure that the aircraft clears obstructions along the approach path and to determine the height above the runway. Even under visual flight conditions it is difficult to accurately evaluate altitude by visual observance of the ground and, in many cases, such as approach over water, such evaluation is virtually impossible.

Finally, the indication of vertical speed must be monitored to control the glide path during approach under visual flight rule (VFR) conditions.

Thus, during landing particularly, the pilot is burdened with a plurality of operating tasks rendered more difficult by the requirement that he scan many instruments. The pilot's task would be simplified if the display could be combined and read with a narrow scan.

In all modern aircraft equipped for instrument flight, there is provided a horizontal director indicator which serves as the primary reference during instrument landing system (ILS) approach. The horizontal director indicator is provided with an artificial horizon for aircraft attitude control in roll and pitch, a course or steering needle to center the plane upon the heading beam, such as the localizer beam, and a glide path indicator to center the aircraft upon the glide path beam. By maintaining the index aircraft representation centered with respect to the steering needle and the glide path needle, the aircraft can be brought into the field by ILS. Under visual flight rules the glide path needle of the horizontal director indicator is not used.

It is, therefore, one object of this invention to provide an indication of vertical speed which can be displayed upon the glide path indicator of the horizontal director indicator during approach under VFR. By such approach, the scan necessary for pilot monitoring of the display instrumentation is greatly reduced.

During take-off, it is necessary to maintain a positive rate of climb during acceleration to the best climb speed. Such information cannot accurately be derived from the horizontal director indicator due to precessing of the gyro under the acceleration forces to take off. Under such conditions it is mandatory that instrumentation be provided to inform the pilot of the direction and rate of vertical speed during the acceleration to the best climb airspeed. The instrument must present the direction (e.g. ascent or descent) and the magnitude of vertical speed instantaneously to be useful in modern high speed aircraft. The accuracy of the instrument in presenting the magnitude of vertical speed is of secondary importance.

It is, therefore, a further object of this invention to provide a vertical speed indicator which will display aircraft vertical speed without lag under aircraft acceleration forces.

An altimeter capable of instantaneously displaying changes in aircraft altitude without indication error caused by high speed acceleration and deceleration forces has already been disclosed to the art in the article entitled, "New Altimeter May Ease Problem of High Altitude Traffic Control" published in the December 5, 1955, issue of Aviation Week by McGraw-Hill Publishing Co., Inc., and in the Institute of Aeronautical Science Report No. 59–84.

However, such instrument cannot be effectively utilized by the pilot to determine vertical speed, since the pilot cannot take the time to mentally compute vertical speed from changes in aircraft altitude over a predetermined interval.

It is, therefore, a further object of this invention to provide a vertical speed indicator on which is displayed information derived from the rate of change of indication of a servo driven altimeter.

It is a still further object of this invention to provide a display of vertical speed upon a continuously coupled display indicator and a selectively coupled controller indicator such as the glide path indicator in the horizontal director indicator.

It is a further object of this invention to provide a vertical speed indicator having no independent sensor mechanisms associated therewith and thus being capable of insertion without increasing control panel volume density.

In accordance with these objects there is provided, in a preferred embodiment of this invention, an altimeter having an indicator positioning servo system responsive to sensors deflected by barometric pressure. Such altimeter is of the type set forth in U.S. Patent No. 3,013,434 issued December 19, 1961, for Automatic Indicating and Control Instrument. Coupled to the altimeter servo motor is a rate generator having the usual squirrel cage rotor and input and output windings at 90° relative orientation. The rate generator will generate an output signal, the amplitude of which is proportional both to the amplitude of input signal and to the rotational speed at which the generator is driven and the polarity or phase of which reverses with reversal of the direction of rotation of the generator.

Thus, the rate generator will modulate the input signal amplitude in accordance with the rate of rotation of the altimeter servo. Since the rate of rotation of the servo is related to pressure change, detected by aneroid capsules, and since the relationship between altitude and pressure is essentially a logarithmic function, the input signal to the rate generator must be modulated by a pressure function to transform the output signal amplitude modulation to a function of vertical speed (e.g. the differential of altitude change with respect to time). For this purpose there is provided a non-linear characteristic potentiometer which will modulate a fixed amplitude signal in accordance with rotation of the rotor thereof. The modulated signal is coupled to the rate generator as the input signal therefor. The potentiometer rotor is coupled to the servo drive through reduction gearing to drive the rotor through a single rotation as the altimeter servo is driven through through the altimeter operating range.

Thus, the output signal from the rate generator will be amplitude modulated in accordance with rate of change of altitude (e.g. vertical speed) and will go through a polarity or phase reversal to indicate the direction of aircraft velocity. Thus, the output signal is suitable for driving an amplitude responsive electric deflection indicator. Suitable means such as an amplifier couples the output signal of the rate generator to a vertical speed indicator. Also, suitable coupling means are provided to selectively apply the vertical speed signal to the glide slope indicator of the horizontal director indicator for presentation of vertical speed information thereon.

A preferred embodiment of this invention is illustrated in the accompanying drawings of which:

FIGURE 1 is a plan view of an aircraft display embodying the present invention;

FIGURE 2 is a schematic diagram of the vertical speed indicator in accordance with this invention;

FIGURE 3 is a plot of the voltage of one portion of the circuit shown in FIGURE 2 in which voltage amplitude is plotted along the scale of ordinates and altitude is plotted along the scale of abscissa; and FIGURE 4 is a plot of the voltage of another portion of the circuit shown in FIGURE 2 in which voltage amplitude is plotted along the scale of ordinates and vertical speed is plotted along the scale of abscissa.

Referring to FIGURE 1 there is shown a portion of the conventional instrumentation display approved by international convention which comprises a horizontal director indicator 10, an altimeter 12 and a vertical speed indicator 14.

The horizontal director indicator presents a combined display comprising an attitude display, a heading director display, and a glide slope director display.

The attitude display, in the instrument illustrated, is of conventional presentation type. The horizon 16 rotates to give roll attitude information. The aircraft indicator 18 moves vertically with respect to the horizon 16 to give pitch information. Thus both pitch and roll attitude is displayed on the HDI.

A course or steering needle 20 of the fly-to type presentation is provided to display heading information as, for example, during omnirange navigation and ILS approach.

A glide slope needle 22 is provided for indicating displacement from the glide slope during ILS approach. In the conventional instrument the needle may be of the fly-to type or the deviation-indicator type. In either case, pilot aligns the wing-tip 24 of the aircraft indicator with the needle for proper alignment with the glide path. In the conventional display the needle is not used except when flying on ILS approach and the needle rests at the top of the scale 26.

The altimeter 12 is provided with an altitude scale 28 driven past an index position 30 in accordance with aircraft altitude. The scale is provided with indicator markings 32 to which numerical representations 34 are applied at convenient intervals. The tape is driven past the index by a servo motor in response to pressure sensitive sensors. For details of a servo driven altimeter suitable for such purpose reference is made to U.S. Patent No. 3,013,434 issued Dec. 19, 1961, for Automatic Indicating and Control Instrument.

In some applications the altimeter will be provided with a single rotation pointer 36 which will be driven through a single rotation during landing approach. For details of such altimeter reference is made to application, Serial No. 828,158 filed July 20, 1959, for Landing Indicator.

The vertical speed indicator 14 is provided with a single pointer 38 pivotably mounted on shaft 40. The pointer scale 42 is provided with numerical indications of aircraft vertical speed of ascent and descent from a central level flight index position 44. The scale is expanded in the range 0–1000 ft./min. to increase reading accuracy and to decrease scan time in this range, since the range is that used during landing and take-off, the most critical flight portions. The expanded scale at the low range also has the valuable attribute of increased needle deflection making changes of vertical speed readily apparent during scan of the instrument by the pilot. Such changes, recognized by the quick scan of needle position, is effective in information transfer, since the exact instrument reading is often of secondary importance. Rates of vertical speed in excess of this range are provided on a compressed scale since reading accuracy in the higher readings is of secondary importance.

The vertical speed indicator 14 is a conventional deflection instrument suitable for aircraft installation. The scale expansion may be provided merely by distortion of the magnetic field pattern in conventional fashion. The deflection instrument will deflect in accordance with the amplitude of the signal applied with the direction of deflection dependent upon the polarity of the applied signal.

The signal having its amplitude proportional to vertical speed (rate of change of altitude with respect to time) and phase related to direction of aircraft vertical speed is derived from the altimeter 12 over leads 46, 48. The signal is modified by amplifier 50 to provide a D.C. signal suitable for driving of the vertical speed indicator to which the signal is coupled over leads 52 and 54. The vertical speed indicator 14 continuously presents vertical speed information to the pilot. Thus, the vertical speed indicator is continuously driven by a signal derived from the altimeter. To decrease the scan spread during various flight portions such as landing, take-off, and level flight, a selectable combined display is provided.

As previously noted, the HDI is provided with a glide slope displacement needle 22 which is energized in accordance with signals received by the ILS receiver 56 which are applied to the HDI over leads 58 and 60 when the rotary switch 62 is in the ILS position. During approach under VFR the glide path displacement needle is normally inoperative. However, to shorten the scan spread it is desirable that the vertical speed signal be applied to the glide path needle 22 by throwing of switch 62 to the landing position. This will apply the vertical speed signal to the glide path indicator.

Since it is preferable that the glide path indicator be as uncluttered as possible and since needle positions will convey the necessary information to the pilot in the shortest possible time, the scale is not marked with numerals. Further, during approach it is unnecessary to display the entire range of vertical speed. For most commercial planes only the range 300–500 ft./min. need be displayed, and the usual practice is to establish a vertical speed in descent of 400 ft./min. To present the desired rate of descent in easily used form, and in a manner similar to the ILS glide path display on current instruments, the center scale marking 64 is established as that corresponding to a rate of descent of 400 ft./min. The upper scale marking 66 corresponds to 300 ft./min. and the lower scale marking corresponds to 500 ft./min. Thus, the pilot need only align the wing tip 24 of the aircraft indicator with the needle 22 to maintain this desired rate of descent. Deviation from the desired rate will be indicated by the needle movement. Alternatively, a fly-to type presentation may be employed in which the upper scale marking corresponds to 500 ft./min. and the lower scale marking corresponds to 300 ft./min. Although the respective merits of each system is in dispute, it is clear that either can be accommodated by the present display system.

To match the signal characteristics to the response characteristics of the glide slope indicator and to properly bias the instrument, there is provided a matching circuit 70. The matcher may include active circuit elements such as an amplifier to match the signal characteristics in the range required to that of the indicator as well as a bias source for zero positioning. The glide path indicator only displays a portion of the total range of vertical speed during landing. However, the switch will be moved to the landing position only when landing, during which time the signal range corresponds with the instrument range. To protect the instrument against pegging damage, the null position adjuster could include a range limiting device such as a saturating amplifier.

Similarly, it is advisable for decreasing scan spread to display vertical speed information on the glide slope indicator during level flight. Such display is particularly advantageous during manual flying of modern jet aircraft. For such display, switch 62 is moved to the level flight position. The matching circuit 71 is provided at match the vertical speed signal to the indicator characteristics and to suitably bias the indicator so that the indicator center scale marking corresponds to zero vertical speed with the upper and lower extreme scale markings corresponding to + and —500 ft./min. respectively.

On takeoff, it is vital that a positive rate of climb be maintained and that the display scan be held to a minimum. For such display the switch 62 is moved to the take-off position.

The information display required by the pilot is display of positive rate of climb from zero to 1000 ft./min. The matcher circuit 73 provides the necessary matching of characteristics and suitable bias so that the lower scale marking 68 corresponds to zero rate of climb and the upper scale marking 66 corresponds to 1000 ft./min.

Thus the information necessary for various flight portions may be selectably displayed on the HLI in easily scanned display, the form of which is adjusted by the matcher circuits to coincide with the display form familiar to the pilot and/or to present the display in easily recognizable manner.

The rotary switch provides interlock protection, preventing simultaneous application of several signals to the display indicator. Suitable indicators could be provided to visually indicate the information displayed. However, such indicators are generally unnecessary since switch setting could be part of the check list prior to going downhill. Further, the interlock function is representative only since in operation interlocks with other operating circuitry may be required.

The arrangement for signal derivation from the altimeter is best understood by reference to FIGURES 2–4.

In FIGURE 2 there is shown an altimeter servo motor 72 rotatable in response to deflection of aneroid pressure capsules to drive the altitude scale past the index position. Coupled to the servo motor through a transmission comprising gear 74 and gear 76 is a rate generator 78. The rate generator may be of conventional construction having a squirrel cage rotor with two windings 90° apart. The input signal is applied to one winding and the output derived from the other winding.

Thus, the output of the rate generator applied to leads 46 and 48 will be a signal whose amplitude is proportional to the product of the amplitude of the input signal applied over leads 80 and 82 and the rate of rotation of the rotor of the rate generator. With the rotor stationary, no signal will be developed on the output leads 46 and 48. However, when the rotor of the rate generator is rotated, a signal the amplitude of which is proportional to the rotational rate and to the amplitude of the input signal and the phase or polarity of which is dependent on the direction of rotor rotation will be developed on the output leads 46 and 48. The rate generator is coupled to the servo motor to maintain the speed range as high as possible, and, thus, to obtain the highest degree of accuracy of the rate signal.

Since the servo is responsive to pressure sensors such as an aneroid capsule, the output of the rate generator with a fixed input signal would be a signal the amplitude of which would be indicative of rate of changes of pressure as a function of time. To obtain an output signal having an amplitude variation indicative of rate of change of altitude with respect to time (vertical speed) the input signal must be modulated by a pressure function.

Although a plot of altitude as a function of pressure is a complex function, it may be approximated within the limits of accuracy necessary by a logarithmic relationship. The differential of altitude with respect to time (vertical speed) will thus be equal to the differential of pressure with respect to time multiplied by a pressure function. Since the voltage output of the rate generator is equal to the differential of pressure with respect to time multiplied by the input voltage, modulation of the input voltage amplitude in accordance with the same pressure function will make the output voltage from the rate generator proportional to vertical speed.

For this purpose there is provided a function potentiometer 84 across the windings of which is coupled a reference voltage source 86. Rotor rotation will move the tap position of the top electrode to generate an output signal which is modulated by the function determined by the potentiometer windings. The output signal is amplified by amplifier 90 to which the signal is coupled over leads 86 and 88 and applied to the input winding of the rate generator 78. In a typical example of servo driven altimeters, the servo motor is a 4-pole, 400 cycle A.C.-motor which can be driven over the full altimeter range by 30,000 rotations. Thus, the reduction gear transmission 91 comprising gears 92 and 94 between the servo motor drive gear 74 and the shaft 96 of the potentiometer rotor must have a gear ratio of 30,000 to 1. It will be apparent that in many instruments it will be desirable to derive rotatable power at a point in the instrument at which the rotational speed is not as great as that of the servo motor drive gear. In such case the transmission 91 will include the internal transmission provided by the aircraft altimeter and the drive from such point can be made at a lower gear ratio. However, such variations will primarily depend upon the design factors for the application intended such as instrument volume density and case dimension limitation.

The output signal from the potentiometer 84 must have a modulated amplitude envelope corresponding to the function of pressure derived from differentiation of the altitude pressure equation. The degree of match of the two curves will determine the system accuracy However, a satisfactory match can be had with a conventional hyperbolic potentiometer. The added expense of a specially fabricated potentiometer is seldom considered necessary since the system accuracy during climb or descent is of secondary importance to the instantaneous indication of vertical speed. Further, the accuracy of the zero vertical speed reading is not affected by the deviation of the potentiometer function from the actual pressure function. By merely matching the potentiometer function with the pressure function in the range 0–1000 ft./min. at low altitudes, the requisite accuracy for almost all applications is achieved.

For example, the actual pressure altitude relationship may be approximated by a logarithmic relationship represented in simplified terms by Equation 1.

$$P = P_0 e^{-\frac{A}{A_0}}$$

where $P$ = pressure in inches Hg
$A$ = altitude in ft.
$P_0$ = 30 inches Hg
$A_0$ = 25,000 ft.

The indication of the accuracy of the approximation may be had by reference to Table I.

Table I

| Altitude (Ft.) | Pressure by equation (in. Hg) | Pressure by altitude table (in. Hg) |
|---|---|---|
| 0 | 30.0 | 29.921 |
| 10,000 | 20.2 | 20.577 |
| 20,000 | 13.4 | 13.750 |
| 30,000 | 9.0 | 8.885 |
| 40,000 | 6.0 | 5.538 |
| 50,000 | 4.1 | 3.425 |
| 60,000 | 2.7 | 2.118 |

As will be noted, the accuracy of the approximation is sufficiently precise for the present application particularly since the approximation is relatively precise at low altitude.

Differentiating Equation 1 with respect to time will give the relationship between rate of change of pressure and rate of change of altitude, as set forth in Equation 2.

Equation 2: $\quad \dfrac{dP}{dt} = -\dfrac{P_0}{A_0} e^{-\frac{A}{A_0}} \dfrac{dA}{dt}$ Transforming terms to obtain the rate of change of altitude as a function of rate of change of pressure yields Equation 3.

Equation 3: $\quad \dfrac{dA}{dt} = -\dfrac{A_0}{P_0} e^{\frac{A}{A_0}} \dfrac{dP}{dt}$ Substituting from Equation 1 for the terms, $$P_0 e^{-\frac{A}{A_0}}$$

in Equation 3 will give Equation 4.

Equation 4: $\quad \dfrac{dA}{dt} = -A_0 \dfrac{1}{P} \dfrac{dP}{dt}$

Thus, the signal input to the rate generator should be proportional to $$\frac{1}{P}$$

This will be recognized as a hyperbolic function and, thus, the potentiometer 84 is a hyperbolic potentiometer generating the hyperbolic function set forth in FIG. 3.

Thus, it can be seen that a potentiometer generating a hyperbolic function will provide a signal relating the rate of change of altitude to rate of change of pressure within the limits of accuracy of the requirements of this application.

The output of a typical potentiometer over the altimeter operating range is shown in FIGURE 3. The output of the rate generator after processing by amplifier 50 is shown in FIGURE 4.

As can be seen from FIGURE 4 the signal output from the amplifier is a D.C. signal the amplitude of which is linearly related to vertical speed and the polarity of which reverses upon reversal of direction of aircraft vertical movement. Thus, the signal may be coupled to the vertical speed indicator for display of vertical speed.

The signal may be selectably coupled to the glide path indicator of the HDI by movement of switch 62. The characteristics of the indicator and that of the signal is matched by suitable matching circuitry to display the desired signal portion of the signal over the entire deflection range of the instrument. The matcher circuit may include a suitable bias source to match the indicator deflection to that most useful to the pilot. The matcher may also include limiter circuitry when only a portion of the signal is to be employed.

It will be apparent that this invention may be variously modified and embodied within the scope of the subjoined claims.

What is claimed is:

1. In combination with an altimeter having a servo motor coupled to an altitude scale to drive said scale past an index position in response to changes in altitude, means coupled to said servo motor for generating an electrical signal having an amplitude variation proportional to the rate of change of altitude with respect to time and having a polarity indicative of the direction of altitude change, said generating means comprising a rate generator coupled to said servo, said rate generator having an input winding and an output winding and an input signal source coupled across said input winding, said input signal having an amplitude varying as a function of servo motor rotation, an indicator responsive to an applied signal to provide a numerical indication of the signal amplitude and relative polarity, and means coupling said output winding to said indicator.

2. A combination in accordance with claim 1 which includes a horizontal director indicator having a glide path indicator, and means for selectably coupling said electrical signal to said glide path indicator.

3. A combination in accordance with claim 2 in which said selectable coupling means comprises a biasing source and means for coupling said electrical signal and said biasing source to said indicator to display variations from level flight by movement of the glide path indicator from a mid-scale position.

4. A combination in accordance with claim 2 in which said selectable coupling means comprises a biasing source and means for coupling said biasing source and said electrical signal to said indicator to display a vertical speed during landing as displacement of the glide path indicator from a mid-scale position as the rate of descent varies from a selected rate of descent.

5. A combination in accordance with claim 2 in which said selectable coupling means comprises a biasing source and means for coupling said biasing source and said electrical signal to said indicator to display positive vertical speed by displacement of the glide path indicator from a zero scale position during aircraft takeoff.

6. A combination in accordance with claim 1 in which said input signal source comprises a potentiometer, said potentiometer having a rotor carrying a tap electrode, a reference voltage source coupled across said potentiometer, means coupling said rotor to said servo motor, and means coupling said tap electrode to the input winding of said rate generator.

7. A combination in accordance with claim 6 in which said potentiometer is a hyperbolic potentiometer wound so that the tap voltage increases with increase in altitude.

References Cited in the file of this patent

UNITED STATES PATENTS

| | | |
|---|---|---|
| 2,656,721 | Melchior | Oct. 27, 1953 |
| 2,834,857 | Kellogg | May 13, 1958 |
| 2,856,772 | Strihafka | Oct. 21, 1958 |
| 2,934,267 | Wirkler et al. | Apr. 26, 1960 |
| 2,942,233 | Lear | June 21, 1960 |